United States Patent
Khalid et al.

(10) Patent No.: US 12,372,033 B1
(45) Date of Patent: Jul. 29, 2025

(54) TURBINE ENGINE WITH SOUND-BASED ACTIVE CONTROL

(71) Applicant: General Electric Company, Schenectady, NY (US)

(72) Inventors: Syed J. Khalid, Palm Beach Gardens, FL (US); David Marion Ostdiek, Liberty Township, OH (US); Matthew J. Drodofsky, Lake Forest Park, WA (US); Trevor Goerig, Mt. Healthy, OH (US); Stefan Joseph Cafaro, Chapel Hill, NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/596,164

(22) Filed: Mar. 5, 2024

(51) Int. Cl.
  *F02C 9/20* (2006.01)
  *F02C 7/045* (2006.01)
  *F02C 9/28* (2006.01)

(52) U.S. Cl.
  CPC ............... *F02C 9/20* (2013.01); *F02C 7/045* (2013.01); *F02C 9/28* (2013.01)

(58) Field of Classification Search
  CPC ...... F02C 9/20; F02C 9/22; F02C 9/28; F02C 9/54; F02C 9/58; F02C 7/045; F02K 3/04; F02K 3/06; F02K 3/062; F02K 3/065; F05D 2260/80; F05D 2260/81; B64D 31/00; B64D 31/02; B64D 31/06
  See application file for complete search history.

(56) References Cited

U.S. PATENT DOCUMENTS

| | | | | |
|---|---|---|---|---|
| 4,130,872 A * | 12/1978 | Haloff | ................... | G01M 15/00 701/100 |
| 5,259,187 A * | 11/1993 | Dunbar | ..................... | F02K 3/06 60/226.3 |
| 5,699,437 A * | 12/1997 | Finn | ................. | G10K 11/17875 381/71.7 |
| 6,768,938 B2 | 7/2004 | Mcbrien | | |
| 7,941,281 B2 | 5/2011 | Rai | | |
| 8,869,537 B2 * | 10/2014 | Geis | ........................ | F01D 17/02 55/306 |
| 10,843,807 B2 * | 11/2020 | Bevirt | ..................... | B64C 11/50 |
| 10,988,246 B2 * | 4/2021 | Kearney-Fischer | ........................ | B64C 11/305 |
| 11,420,772 B2 | 8/2022 | Tomescu | | |

(Continued)

FOREIGN PATENT DOCUMENTS

| | | |
|---|---|---|
| FR | 3127024 | 3/2023 |
| FR | 3127025 | 3/2023 |

(Continued)

*Primary Examiner* — Alain Chau
(74) *Attorney, Agent, or Firm* — Smith Gambrell & Russell LLP

(57) ABSTRACT

An engine with sound-based active controls is provided. The engine includes a sound sensor coupled to the engine system configured to capture sound from the engine system, one or more thrust effector devices, and an engine controller. The engine controller is configured to: determine a sound profile based on signals from the sound sensor, determine a modified control parameter for at least one of the one or more thrust effector devices based on the sound profile and a nominal schedule; and control the at least one of the one or more thrust effector devices according to the modified control parameter, deviating from the nominal schedule.

19 Claims, 7 Drawing Sheets

(56) References Cited

U.S. PATENT DOCUMENTS

| | | |
|---|---|---|
| 11,698,027 B2 | 7/2023 | Ciciriello |
| 12,051,289 B2 * | 7/2024 | Nguyen .................. F01D 21/003 |
| 2004/0091125 A1 * | 5/2004 | Choe ....................... H04R 23/00 |
| | | 310/322 |
| 2011/0079015 A1 * | 4/2011 | Geis ......................... F02C 9/22 |
| | | 701/100 |
| 2012/0110980 A1 | 5/2012 | Grabowski |
| 2013/0006581 A1 | 1/2013 | Singh |
| 2017/0107914 A1 * | 4/2017 | Lu ............................. F02K 3/04 |
| 2017/0167930 A1 | 6/2017 | Salm |
| 2018/0364120 A1 * | 12/2018 | Ribarov ................ G01N 29/036 |
| 2020/0023957 A1 * | 1/2020 | Kearney-Fischer ......................... |
| | | G10K 11/175 |
| 2020/0269990 A1 * | 8/2020 | Bevirt .................... B64D 31/06 |
| 2020/0409322 A1 * | 12/2020 | Sanchez Del Valle ..................... |
| | | G05B 19/042 |
| 2021/0025916 A1 * | 1/2021 | Sly ........................ G01P 13/025 |
| 2021/0078715 A1 * | 3/2021 | Bevirt .................... B64D 31/12 |
| 2021/0108595 A1 * | 4/2021 | Khalid ...................... F01D 5/30 |
| 2021/0372330 A1 * | 12/2021 | Angello .................... G01H 1/12 |
| 2022/0068057 A1 * | 3/2022 | Nguyen ................. G01N 29/46 |
| 2022/0074816 A1 * | 3/2022 | Kyritsis ................ F01D 21/003 |
| 2022/0266399 A1 | 8/2022 | Griffin |
| 2023/0103781 A1 | 4/2023 | Bechhoefer |
| 2023/0150681 A1 * | 5/2023 | Ramakrishnan ........... F02C 9/20 |
| | | 60/773 |
| 2023/0184179 A1 * | 6/2023 | Swann ................... B64D 27/24 |
| | | 60/773 |
| 2023/0311847 A1 * | 10/2023 | Chen ........................ F02C 9/00 |
| | | 701/22 |
| 2023/0419936 A1 * | 12/2023 | Machunze ........... G10K 11/172 |

FOREIGN PATENT DOCUMENTS

| | | |
|---|---|---|
| FR | 3127269 | 3/2023 |
| FR | 3129375 | 5/2023 |
| FR | 3129428 | 5/2023 |
| FR | 3129432 | 5/2023 |
| FR | 3129436 | 5/2023 |
| FR | 3129690 | 6/2023 |
| FR | 3129970 | 6/2023 |
| FR | 3129972 | 6/2023 |
| FR | 3130313 | 6/2023 |
| FR | 3130323 | 6/2023 |
| FR | 3130747 | 6/2023 |
| FR | 3130874 | 6/2023 |
| FR | 3130875 | 6/2023 |
| FR | 3130877 | 6/2023 |
| FR | 3130879 | 6/2023 |
| FR | 3130894 | 6/2023 |
| FR | 3130895 | 6/2023 |
| FR | 3130896 | 6/2023 |
| FR | 3130897 | 6/2023 |
| FR | 3132279 | 8/2023 |
| FR | 3132729 | 8/2023 |
| FR | 3132743 | 8/2023 |
| FR | 3133367 | 9/2023 |
| FR | 3133368 | 9/2023 |

* cited by examiner

TURBINE ENGINE WITH SOUND-BASED ACTIVE CONTROL

FIELD OF THE DISCLOSURE

The present subject matter relates generally to turbine engines, and specifically to sound-based active control of a turbine engine.

BACKGROUND

Turbine engines can include variable pitch blades that can be pitched to affect engine output and fuel consumption. For example, the pitch may be opened from the nominal position to increase the open fan thrust at a given fan speed. This characteristic can be utilized to increase thrust at a given speed, either in a transient mode or in a steady-state mode when a decrease in open fan efficiency can be tolerated.

BRIEF DESCRIPTION OF THE DRAWINGS

A full and enabling description of the present disclosure, including the best mode thereof, directed to one of ordinary skill in the art, is set forth in the specification, which makes reference to the appended figures, in which.

DETAILED DESCRIPTION

Figure 1:
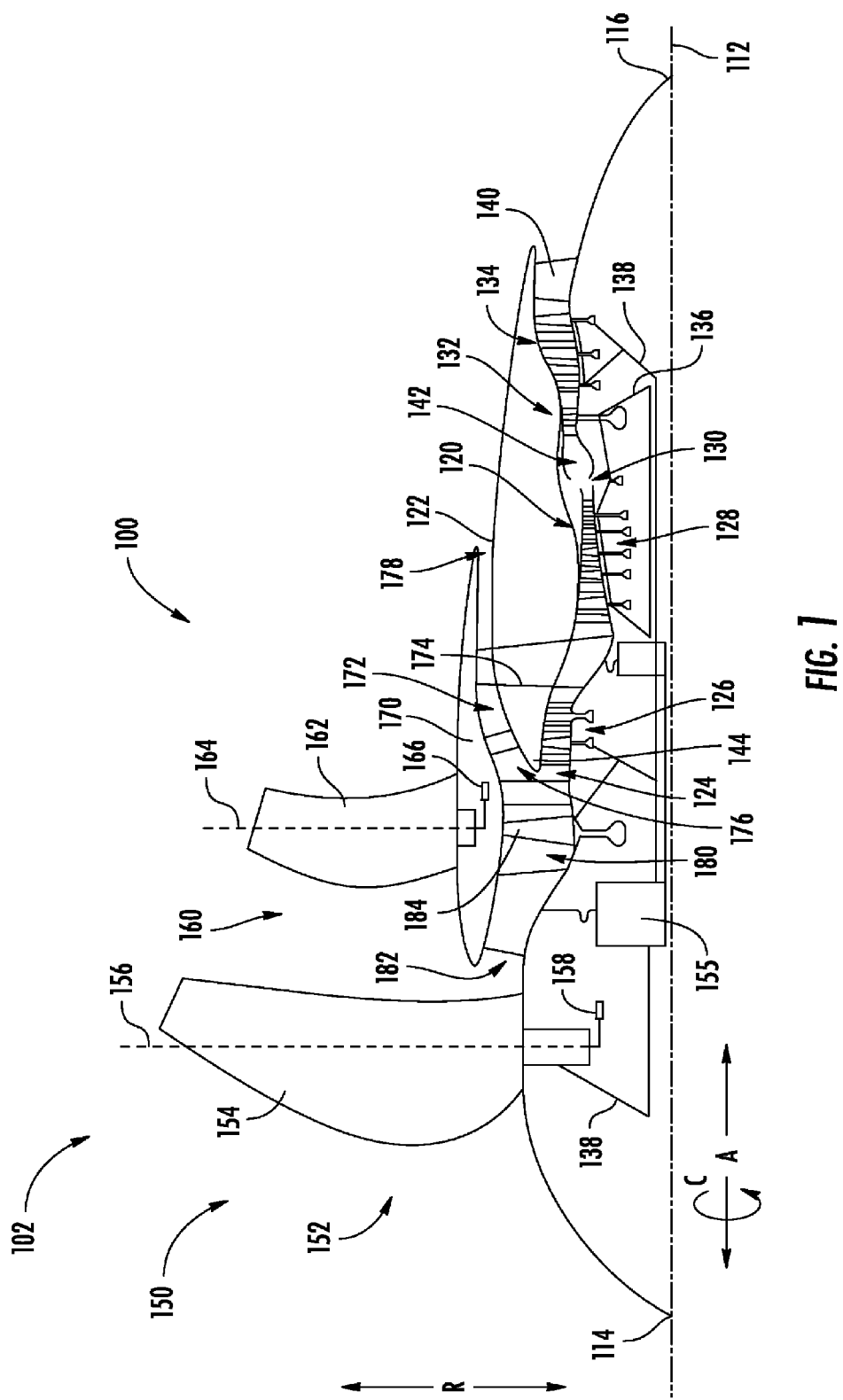
FIG. 1 is a cross-sectional side view of an embodiment of a propulsion system according to some embodiments.

Reference now will be made in detail to embodiments of the present disclosure, one or more examples of which are illustrated in the drawings. Each example is provided by way of explanation of the present disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first," "second," "third," etc. may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural referents unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," "approximately," "almost," and "substantially" are not to be limited to the precise value specified. In some instances, the approximating language may correspond to the precision of an instrument for measuring the value. For example, the approximating language may refer to being within a 1, 2, 4, 10, 15, or 20 percent margin. These approximating margins may apply to a single value, either or both endpoints defining numerical ranges, and/or the margin for ranges between endpoints. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In some aspects, methods and systems are described herein for enhancing the efficiency of open fan engines and improving Engine Total Airflow (ETAF). Uncertainty in ETAF value is influenced by several variables, such as the surface finish of fan parts, the effective positions of variable geometry, and flow angularity due to airplane flight attitudes. High fan noise, often associated with strong airfoil wake strengths and high turbulence, can degrade ETAF.

In some embodiments, active control of relevant noise components is provided as a solution to the dual problem of poor efficiency and high noise. In some embodiments, the active control involves adjusting fan pitch, outlet guide vane stagger, and optimizing fan speed. A closed-loop action may be employed to decrease noise, and effector settings used for noise mitigation can also lead to an increase in fan efficiency. In some embodiments, the engine system uses acoustic data to increase engine efficiency based on the correspondence of a maximum operating efficiency point for each individual fan blade and a point of lower acoustic profile/noise generated per blade.

Aircraft cabin and community noise can be a consequence of the interaction between certain components of turbomachinery noise and the aircraft structure. In some aspects, by reducing the triggering mechanism of turbomachinery noise using the closed-loop action, interaction with the aircraft structure is lessened which can lead to a decrease in cabin and community noise. A sensor system for measuring the triggering components of turbomachinery noise may be used herein. For example, phased array sensors may be used for measuring the triggering component of noise for input into the engine controller, such as the full authority digital engine control (FADEC). In some embodiments, a steepest descent search algorithm is incorporated into the FADEC, which adjusts the effectors to minimize the triggering noise components while maintaining the required thrust. In some embodiments, the systems and methods described herein allow for the simultaneous achievement of noise reduction and efficiency improvement in open fan engines.

In some aspects, an engine with sound-based active controls for improved engine efficiency is provided. The engine includes a sound sensor coupled to the engine system configured to capture sound from the engine system, one or more thrust effector devices, and an engine controller. The engine controller is configured to determine a sound profile based on signals from the sound sensor, determine a modified control parameter for at least one of the one or more thrust effector devices based on the sound profile and a nominal schedule; and control the at least one of the one or more thrust effector devices according to the modified control parameter, deviating from the nominal schedule.

Referring now to FIG. 1, a schematic cross-sectional view of a gas turbine engine 100 is provided according to an example embodiment of the present disclosure. It will be appreciated, however, that the exemplary single rotor unducted engine 100 depicted in FIG. 1 is by way of example only, and that in other exemplary embodiments, the engine 100 may have any other suitable configuration, including, for example, any other suitable number of shafts or spools, turbines, compressors, etc.; fixed-pitch blades, a direct-drive configuration (i.e., may not include the gearbox 155); etc. For example, in other exemplary embodiments, the engine 100 may be a three-spool engine, having an intermediate speed compressor and/or turbine. In such a configuration, it will be appreciated that the terms "high" and "low," as used herein with respect to the speed and/or pressure of a turbine, compressor, or spool are terms of convenience to differentiate between the components, but do not require any specific relative speeds and/or pressures, and are not exclusive of additional compressors, turbines, and/or spools or shafts.

Additionally, or alternatively, in other exemplary embodiments, any other suitable gas turbine engine may be provided. For example, in other exemplary embodiments, the gas turbine engine may be a turboshaft engine, a turboprop engine, turbojet engine, a rotorcraft engine, a ducted engine with variable pitch blades, etc. Moreover, for example, although the engine is depicted as a single unducted rotor engine, in other embodiments, the engine may include a multi-stage open rotor configuration or a ducted engine, and aspects of the disclosure described hereinbelow may be incorporated therein.

FIG. 1 provides an engine 100 having a rotor assembly with a single stage of unducted rotor blades. In such a manner, the rotor assembly may be referred to herein as an "unducted fan," or the entire gas turbine engine 100 may be referred to as an "unducted engine," or an engine having an open rotor propulsion system 102. In addition, the engine of FIG. 1 includes a mid-fan stream extending from the compressor section to a rotor assembly flowpath over the turbomachine, as will be explained in more detail below. It is also contemplated that, in other exemplary embodiments, the present disclosure is compatible with an engine having a duct around the unducted fan. It is also contemplated that, in other exemplary embodiments, the present disclosure is compatible with a turbofan engine having a third stream as described herein.

For reference, the gas turbine engine 100 defines an axial direction A, a radial direction R, and a circumferential direction C. Moreover, the gas turbine engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The gas turbine engine 100 extends between a forward end 114 and an aft end 116, e.g., along the axial direction A.

The gas turbine engine 100 includes a turbomachine 120, also referred to as a core of the gas turbine engine 100, and a rotor assembly, also referred to as a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air and produce high energy combustion products.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a core or turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. As depicted, the fan 152 includes an array of fan blades 154. The fan blades 154 are rotatable, e.g., about the longitudinal axis 112. As noted above, the fan 152 is drivingly coupled with the low pressure turbine 134 via the LP shaft 138. The fan 152 can be directly coupled with the LP shaft 138, e.g., in a direct-drive configuration. However, for the embodiments shown in FIG. 1, the fan 152 is coupled with the LP shaft 138 via a speed reduction gearbox 155, e.g., in an indirect-drive or geared-drive configuration.

Moreover, the fan blades 154 can be arranged in equal spacing around the longitudinal axis 112. Each fan blade 154 has a root and a tip and a span defined therebetween. Each fan blade 154 defines a central blade axis 156. For this embodiment, each fan blade 154 of the fan 152 is rotatable about their respective central blade axis 156, e.g., in unison with one another. One or more actuators 158 are provided to facilitate such rotation and therefore may be used to change a pitch of the fan blades 154 about their respective central blade axis 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about their respective central blade axis 164, e.g., in unison with one another. One or more actuators 166 are provided to facilitate such rotation and therefore may be used to change a pitch of the fan guide vane 162 about their respective central blade axis 164. However, in other embodiments, each fan guide vane 162 may be fixed or unable to be pitched about its central blade axis 164. The fan guide vanes 162 are mounted to a fan cowl 170.

As shown in FIG. 1, in addition to the fan 152, which is unducted, a ducted fan 184 is included aft of the fan 152, such that the gas turbine engine 100 includes both a ducted and an unducted fan which both serve to generate thrust through the movement of air without passage through at least a portion of the turbomachine 120 (e.g., the HP compressor 128 and combustion section for the embodiment depicted). The ducted fan 184 may be at about the same axial location as the fan blade 154 or vanes 162, and radially inward of the fan blade 154 or vanes 162. The ducted fan 184, for the embodiment depicted, is driven by the low pressure turbine 134 (e.g., coupled to the LP shaft 138).

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan flow path or fan duct 172. The fan flowpath or fan duct 172 may be referred to as a third stream of the gas turbine engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl.

The gas turbine engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a splitter or leading edge 144 of the core cowl 122. The inlet duct 180 is wider than the core duct 142 along the radial direction R. The inlet duct 180 is also wider than the fan duct 172 along the radial direction R.

Figure 2:
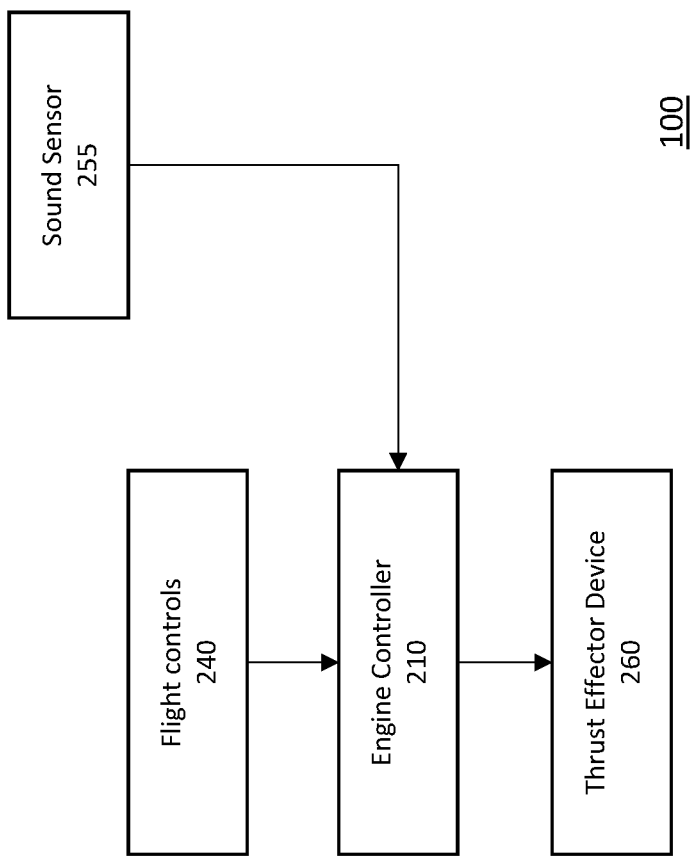
FIG. 2 is a simplified block diagram of an engine control system according to some embodiments.

Next referring to FIG. 2, a block diagram of an engine 100 is shown. The engine 100 includes an engine controller 210 configured to receive input from flight controls 240 and a sound sensor 255 and control one or more thrust effector devices 260. In some embodiments, the engine controller 210 may be a processor-based control system of an engine such as a FADEC of the engine 100. In some embodiments, the engine controller 210 includes the FADEC and a sound processing module implemented as a software module of the FADEC or a separate hardware module. The engine controller 210 may be configured to control one or more thrust effector devices 260 based on signals from the sound sensor. In some embodiments, the engine controller 210 executes a closed-loop control between the sound sensor and one or more thrust effector devices 260. Operations and functions of the engine controller 210 for sound-based active control are described in more detail with reference to FIGS. 3-7 herein.

In some embodiments, the flight controls 240 may be an aircraft controller, an autothrottle system, and/or other pilot-operated inputs. In some embodiments, the flight controls 240 may set and change target engine parameters during various phases of flight. In some embodiments, the target engine parameters include one or more of target thrust output, speed, torque, power pressure, or pressure ratio. In some embodiments, the engine controller 210 is configured to operate various components of the engine 100 based at least in part on signals received from the flight controls 240.

The sound sensor 255 includes one or more devices for capturing acoustic data from the engine 100. In some embodiments, the sound sensor is part of the on-board sensor system of the engine 100 for measuring environmental, flight, and/or engine conditions. In some embodiments, the sound sensor includes a phased array sound sensor, a microelectromechanical (MEMS) phased array sound sensor, one or more directional microphones, single axis uni-directional microphones, triple axis multi-directional microphones, one or more pressure transducer sound sensors, one or more silicon-on-insulator (SOI) sound sensors, or the like. Generally, the sound sensor 255 may be any on-aircraft sensor capable of measuring amplitude, phase, and/or direction of sound from an engine. In some embodiments, the sound sensor is mounted near the fan section 150 or the fan guide vane array 160 of the engine 100. In some embodiments, the sound sensor may be mounted on or within the fan cowl 170 or the core cowl 122. In some embodiments, for a ducted engine, the sound sensor may be mounted on the duct around the fan section 150.

The thrust effector device 260 may include one or more engine components configured to affect airflow around the engine 100. In some embodiments, one or more thrust effector devices 260 may include variable geometry components (e.g., variable pitch blades, guide vanes, nozzles) with geometry that can be physically manipulated by an actuator to affect airflow. In some embodiments, one or more thrust effector devices 260 may be a fan speed effector such as a fuel injector or an electric fan motor. In some embodiments, the one or more thrust effector devices 260 includes one or more of variable pitch blades, a fuel injector, a plurality of variable stator vanes, a plurality of inlet guide vanes, a plurality of outlet guide vanes, a variable nozzle, or an electric motor. FIG. 2 is only a simplified block diagram, and, in some embodiments, the engine controller 210 is further configured to control other engine components, such as components described with reference to FIG. 1, aside from the one or more thrust effector devices 260.

Figure 3:
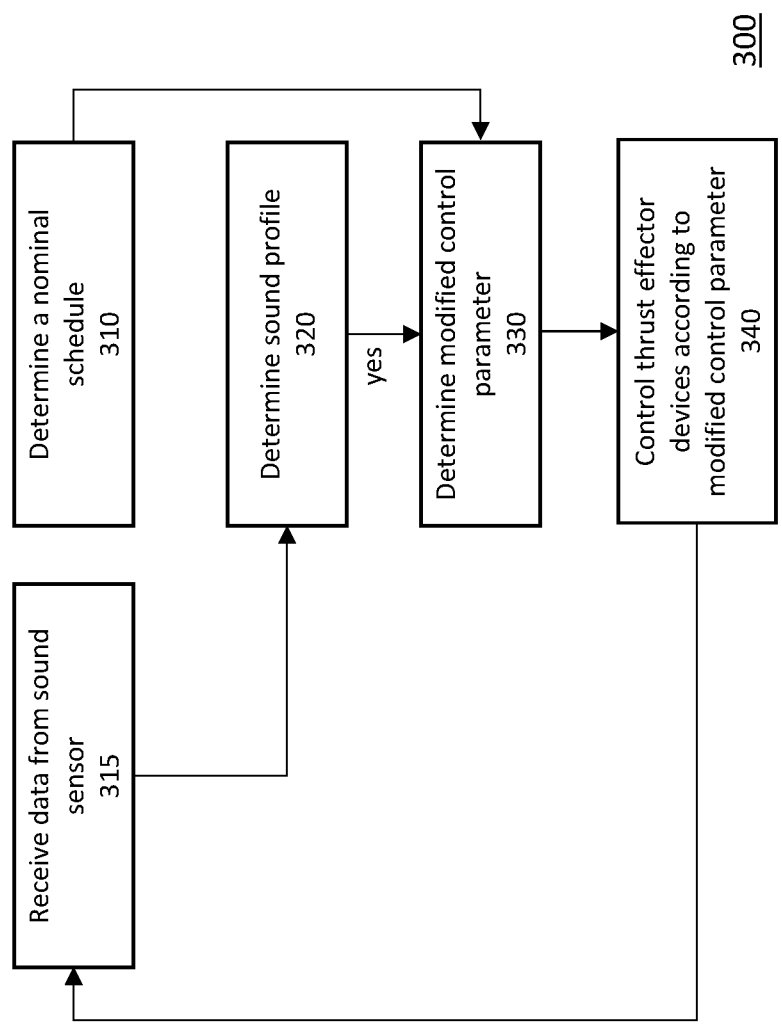
FIG. 3 is a flow diagram of a method for sound-based active engine control according to some embodiments.

Next referring to FIG. 3, a method 300 for controlling an engine for with active sound-based control is shown. In some embodiments, one or more steps of FIG. 3 may be performed with a processor-based control system of an engine such as the engine controller 210 of the engine 100.

In step 310, the engine 100 determines a nominal schedule. As used herein, the nominal schedule refers to a predefined and stored set of operational parameters and/or limits that dictates the engine's behavior. In some embodiments, the nominal schedule may be stored on and retrieved from an on-board memory of the engine 100. In some embodiments, the engine controller 210 is configured to select control parameters according to the nominal schedule based on flight control inputs received from an aircraft controller such as flight controls 240. In some embodiments, the nominal schedule defines the control parameters based on a target thrust determined based on an engine command from an aircraft controller in communication with the FADEC of the engine, such as the flight controls 240 in communication with engine controller 210. In some embodiments, the nominal schedule is a schedule according to a conventional engine control scheme where sequences of operation parameters to achieve a target engine output is determined based on prior testing/configuration and stored on an on-board memory of the aircraft. In some embodiments, the nominal schedule may be a standard schedule used across an engine model.

In step 315, the sensor data is received from a sound sensor 255 configured to capture sound/acoustic data from the engine 100. In some embodiments, the sensor data may be from one or more sound sensors 255 onboard and/or embedded on the engine 100. In some embodiments, the sound data may be captured by a phased array sound sensor such as a MEMS phased array sound sensor. In some embodiments, the sound may include sound from various components of the engine 100 such as sound generated by the interactions between airflow and one or more of fan section 150, fan guide vane array 160, core or turbomachine exhaust nozzle 140, or fan exhaust nozzle 178. In some embodiments, the captured sound data may include frequency, amplitude, location, and/or phase information.

In step 320, the engine controller 210 determines a sound profile based on the data captured in step 315. In some embodiments, the sound profile includes one or more sound components, each sound component having frequencies, amplitudes, and/or phases associated with one or more components or locations of the engine 100. In some embodiments, the sound profile is determined based on isolating sound components from different sources based on location, frequency, amplitude, and phase data of sound waves captured by the sound sensor. In some embodiments, the engine controller 210 is configured to process the acoustic data captured by individual sensor elements within a sensor array and use frequency information, and/or phase information to separate sounds associated different locations and/or components of the engine 100. In some embodiments, the sound profile isolates fan sound components associated with self-noise of a fan and interaction sound components associated with airflow between rotating blades of the fan and other engine components. In some embodiments, the engine 100 includes a bandpass filter for isolating a select frequency band from the sound data captured by the sound sensor.

In some embodiments, sound amplitudes are recorded as root mean square (RMS) values for one or more frequency bands. In some embodiments, the engine 100 includes an analog RMS meter for computing RMS values of the sound captured from the sound sensor 255 or includes a software RMS calculation algorithm. While RMS values are described herein, in some embodiments, the engine controller 210 may execute a real-time Fast Fourier Transformation (FFT) algorithm or use other parameters indicative of sound magnitude to form the sound profile.

In some embodiments, the engine controller 210 is configured to determine whether a noise reduction trigger condition is present prior to determining modified control parameters in step 330 and/or prior to modifying the controls of the thrust effector devices in step 340. In some embodiments, the engine controller 210 controls the thrust effector devices 260. In some embodiments, the noise reduction trigger condition includes the engine system being in a steady-state operation such as cruise. The steady-state operation may be determined by the engine controller 210 based on a sensor system of the engine and/or based on a signal from flight controls 240 of the aircraft. In some embodiments, the noise reduction trigger condition is detected when a select sound component of the sound profile has a select frequency band with a magnitude exceeding a threshold value. For example, the trigger condition may be the RMS value of a sound component associated with fan interaction noise being above a threshold decibel. The frequency band selection and threshold value may vary between engine models and aircraft on which the engine is operating. In some embodiments, the frequency band(s) and threshold value(s) may be determined based on computer-based modeling, digital twin modeling, or analysis of data collected during real-world operations of the engine. In some embodiments, the engine controller 210 controls the one or more thrust effector devices 260 in a closed control loop with the sound sensor when the trigger condition is present, and controls the one or more thrust effector devices 260 in an open control loop with the sound sensor when the trigger condition is not present.

In step 330, the engine controller 210 determines modified control parameters for one or more thrust effector devices 260. In some embodiments, the engine controller 210 may modify the operations of one, two, three, or more types of thrust effector devices 260 based on the sound profile and the nominal schedule. In some embodiments, the modified control parameter includes increments or modifications to the controls of one or more thrust effector devices 260 based on the nominal schedule. For example, the modified control parameters may include an increase of decrees of fan blade pitch angle or vane pitch angle as scheduled according to the nominal schedule. In some embodiments, thrust effecter devices 260 may include variable pitch blades, variable pitch inlet guide vanes, variable pitch outlet guide vanes, a turbine exhaust nozzle, a fan exhaust nozzle, fuel controls, and/or an electric fan motor. In some embodiments, the modified control parameters are selected to maintain thrust while reducing noise.

In some embodiments, the modified operating parameters may be determined based on the engine controller performing a pitch search by incrementally changing a pitch angle of one or more rotating blades or stationary vanes of the engine system until a local minimum sound amplitude for a select frequency band is identified. For example, the pitch change may continue while the sound magnitude in the select frequency band reduces but stop when an increase of sound magnitude is detected. The pitch angle associated with the local minimum may then be used as the modified control parameter.

In some embodiments, the gas turbine engine 100 includes a memory storage device storing a control parameter table including modified control parameters corresponding to one or more engine parameters, and the modified control parameter is determined based on the control parameter table. The engine parameters may include a target thrust, a target speed, control parameters of the nominal schedule, and/or signals from one or more engine, flight, or environmental sensors. The modified control parameters may include one or more of blade pitch angle, inlet guide vane pitch angle, outlet guide vane pitch angle, fan speed, nozzle size, etc. For example, a combination of control and measured variables, including the sound profile, may be used to retrieve the corresponding active control parameters from the table.

In some embodiments, the gas turbine engine 100 includes a memory storage device storing an engine model, wherein the modified control parameter is selected from candidate control parameter set based on using the engine model to predict acoustic derivatives/sound magnitudes for each set of candidate control parameters. In some embodiments, the engine controller 210 may select a set of candidate control parameters that would maintain thrust based on a lookup table and/or the nominal schedule. In some embodiments, the candidate control parameter sets may be selected based on control and/or sensor signals received at the engine controller 210. The candidate control parameters are then tested against the engine model to select a candidate set that has the lowest predicted sound magnitude. In some embodiments, to maintain thrust while finding an optimal efficiency point, the engine controller 210 can use an embedded model indication of thrust or sensors and calculations indicative of thrust, such as fan power using speed and torque sensors.

In some embodiments, the modified control parameter is determined based on a constraint optimization algorithm and an engine model, wherein the constraint optimization algorithm uses maintaining thrust within a threshold range as a constraint and reducing sound amplitude as a cost function. In some embodiments, the modified control parameter is determined based on a steepest descent algorithm.

In some embodiments, the thrust effector devices 260 include a blade pitch change mechanism configured to change pitch angles of the rotating blades of the engine system, such as actuator 158, and the modified control parameter includes a change in the pitch angles of one or more of the rotating blades. In some embodiments, the modified control parameter changes the pitch angles of only a subset of the rotating blades while others of the rotating blades are pitched according to the nominal schedule.

In some embodiments, the thrust effector devices 260 include one or more vane pitch changing mechanisms configured to change pitch angles of inlet guide vanes and/or outlet guide vanes, such as actuators 166, and the modified control parameter includes a change in the pitch angles of one or more of the vanes. In some embodiments, the modified control parameter changes the pitch angles of only a subset of the outlet guide vanes while others of the vanes are pitched according to the nominal schedule.

In some embodiments, the thrust effector devices 260 include a fuel injector and/or an electric fan motor, and the modified control parameter includes a modified blade rotation speed which may be affected by fuel injection rate and/or an electric motor output.

In step 340, the engine controller 210 controls one or more thrust effector devices 260 according to the modified control parameter, deviating from the nominal schedule of step 310. For example, the engine controller 210 may change the pitch of one or more fan blades and/or one or more vanes in step 340. In another example, the engine controller 210 may change the fan speed via fuel controls or electric motor controls. In some embodiments, the modified control parameter may be executed as an adjustment or increment of the nominal schedule. In some embodiments, other engine components (e.g., fuel, electric motor) may be controlled to compensate for the effect of the modified thrust effector devices on thrust. For example, when fan pitch is closed, fan speed may be increased via fuel control to maintain thrust.

After step 340, the engine controller 210 may continue to capture data via the sound sensor 255 and determine whether the magnitude of the component sound in the sound profile has decreased while at least one of the one or more thrust effector devices are controlled according to the modified control parameter. In some embodiments, if the sound magnitude increases or does not decrease, the process may return to step 320 and the engine controller 210 may determine one or more sets of subsequent modified control parameters and control the one or more thrust effector devices 260 according to the one or more sets of subsequent modified control parameters until the sound magnitude decreases. For example, a different candidate modified control parameter set may be selected or a different thrust effector device may be selected.

In some embodiments, after step 340, the engine controller 210 is configured to store the modified control parameters for engine health analysis. In some embodiments, the engine controller 210 determines a subsequent sound profile based on data captured by the sound sensor while at least one of the one or more thrust effector devices 260 are controlled according to the modified control parameter. The subsequent sound profile may be stored with the modified control parameter in an engine model and/or be used to train the engine model using a machine learning algorithm.

In some embodiments, modified control parameters and engine parameters from successful and/or unsuccessful sound reduction may be stored as training/learning data. The control parameter table and/or the engine model may be updated based on the training/learning data with further modeling and/or machine learning. For example, in response to detecting successful sound reduction (e.g., sound is reduced while thrust is maintained), target engine parameter and/or flight or engine condition may be stored along with the applied modified control parameters.

In some embodiments, after step 340, the engine controller 210 is further configured to send the modified control parameter to an aircraft controller and/or a second engine system mounted on the same aircraft to cause synchronization of the second engine system with the engine system. Synchronization of engines is described in further detail with reference to FIG. 6 herein.

With the process shown in FIG. 3, the engine 100 can be configured to automatically modifying engine controls based on engine sound. By implementing the method 300 on the engine controller 210, the engine can dynamically deviate from a nominal schedule to improve engine efficiency through active sound/noise reduction.

Figure 4:
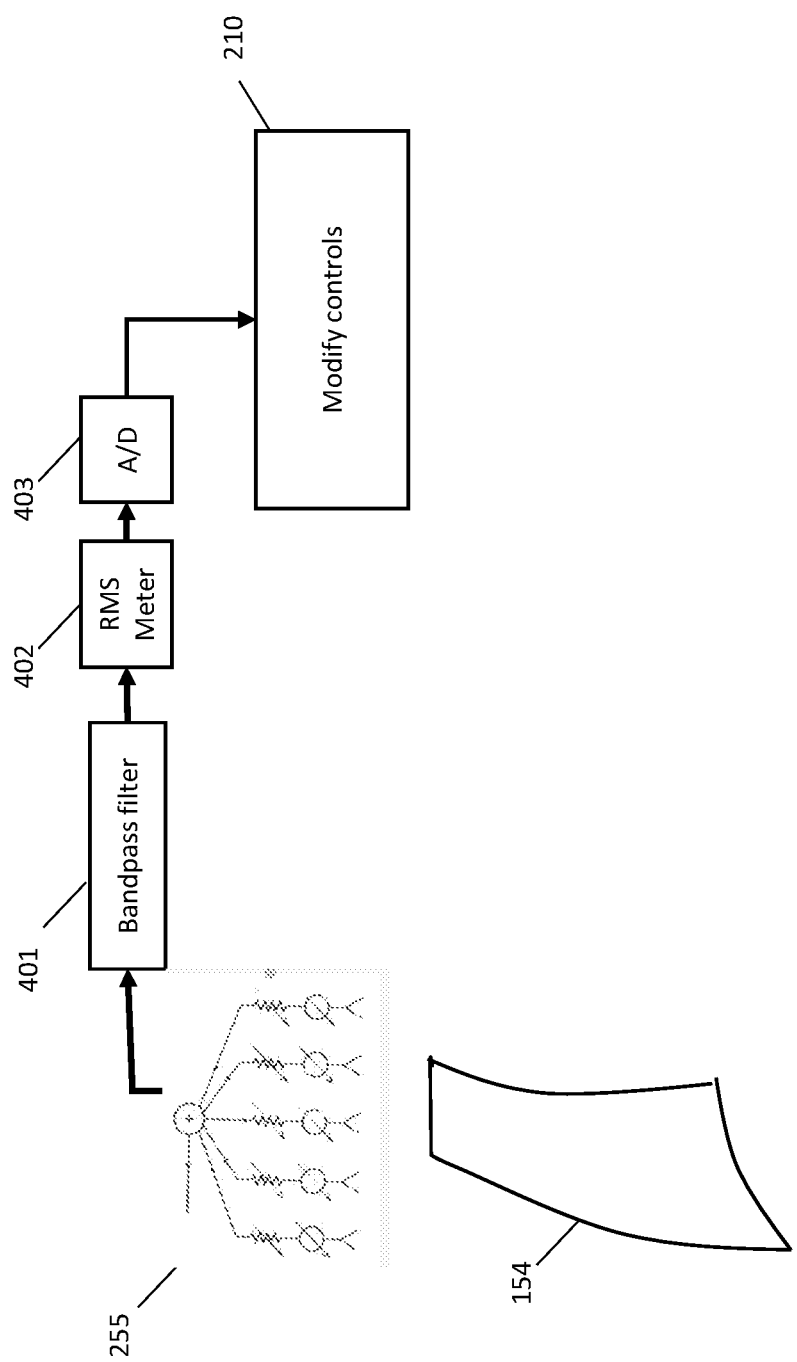
FIG. 4 is a simplified block diagram of an engine system according to some embodiments.

Next referring to FIG. 4, a simplified block diagram of an engine system according to some embodiments is shown.

The engine 100 includes a sound sensor positioned to capture data from fan blades 154 of an engine. In some embodiments, the sound sensor is a phased array sound sensor such as a MEMS phased array sound sensor mounted on the engine 100. The signal from the sound sensor passes through a bandpass filter 401 to select a target sound frequency band. The RMS meter 402 is configured to generate RMS values based on the output of the bandpass filter 401. The RMS values are converted to digital signal by the converter 403 for the engine controller 210. The engine controller 210 does not then perform RMS calculations and can directly use the received digital signal to determine whether the RMS value exceeds the threshold. For example, as an engine 100 operates, the RMS meter 402 may continuously provide RMS value to the engine controller 210. The engine controller 210 may initially follow the default schedule until the received RMS value exceeds a threshold, at which point, the engine controller 210 may begin to control one or more thrust effector devices 206 according to modified control parameters. In some embodiments, the inclusion of the RMS meter 402 reduces the computational load on the engine controller 210 by removing the need to perform software RM computations and allows for an engine controller 210 with low sampling rate to perform sound/noise detection with higher sampling rate. In some embodiments, however, the engine does not include an RMS meter 402 and the engine controller 210 performs software RMS computation on the received digital signal to form the sound profile for the engine 100.

Figure 5:
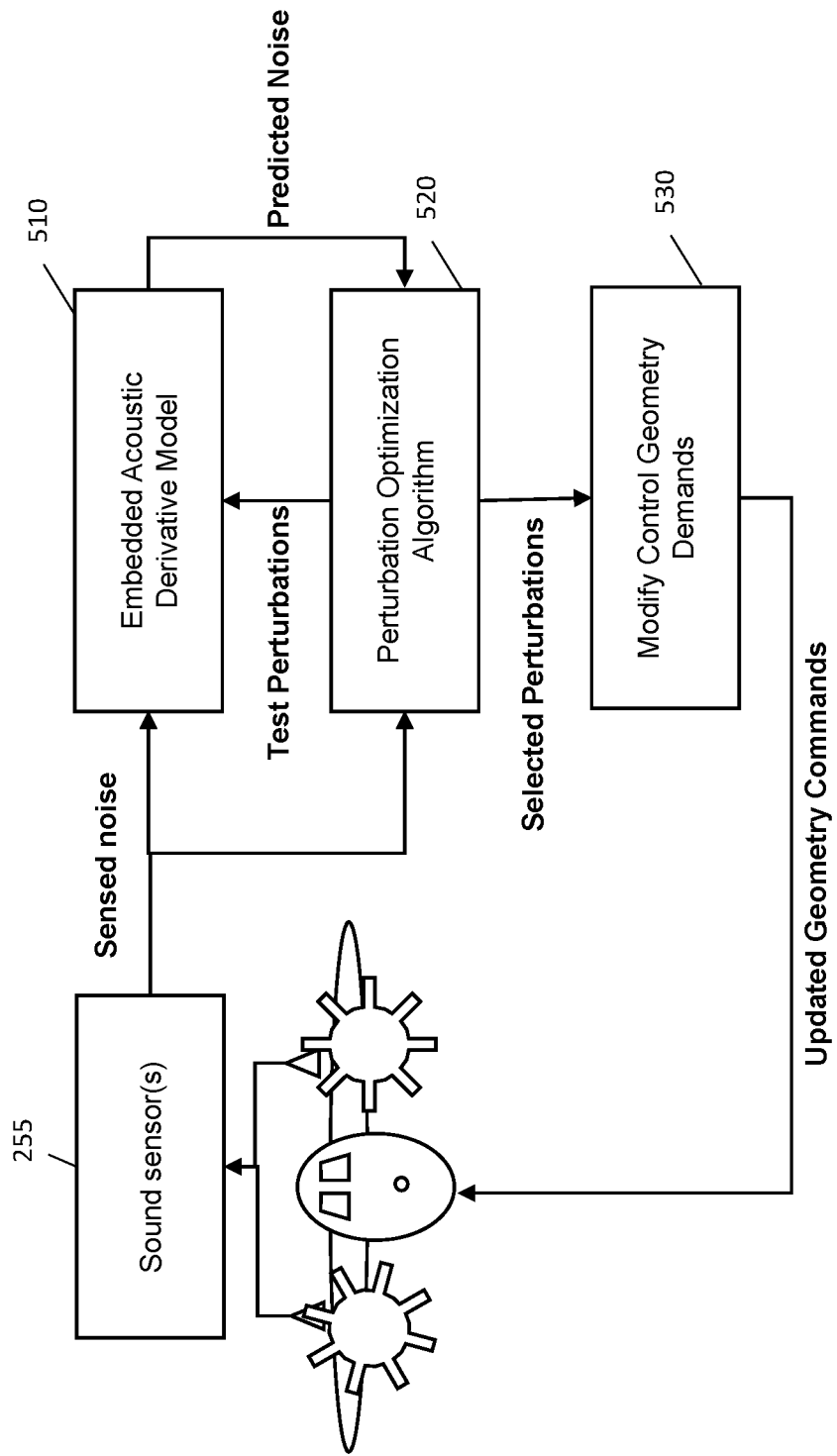
FIG. 5 is a functional block diagram for sound-based active engine control according to some embodiments.

Next referring to FIG. 5, a flow diagram of a process of sound-based engine controls according to some embodiments is shown. In some embodiments, one or more steps of FIG. 5 may be performed with a processor-based control system of an engine such as the engine controller 210 of the engine 100.

In FIG. 5, the sound sensor 255 captures data from the engines of the aircraft and sends the sensed noise to an embedded acoustic derivative model 510 and a perturbation optimization algorithm 520. The perturbation optimization algorithm 520 selects a set of test perturbations, also referred to as candidate control parameters herein. In some embodiments, the test perturbations are selected based on one or more of target engine parameters, flight condition, and/or sound profile determined based on data captured by the sound sensor 255. The embedded acoustic derivative model 510 is used to predict the noise level associated with each test perturbation. The perturbation with the least amount of predicted noise may be selected and used to modify control geometry demand 530. The engine controller then updates the geometry commands to engine components according to the determined modified control parameter. For example, two or more potential variable pitch angles for rotor blades may be used as perturbations and the embedded acoustic derivative model 510 may be used to predict noise levels associated with each potential pitch angle. In some embodiments, the embedded acoustic derivative model 510 may be used to predict noise level associated with multiple combinations parameters for two or more thrust effector devices 260 (e.g., multiple rotor blade pitch angles in combination with multiple vane pitch angles).

Figure 6:
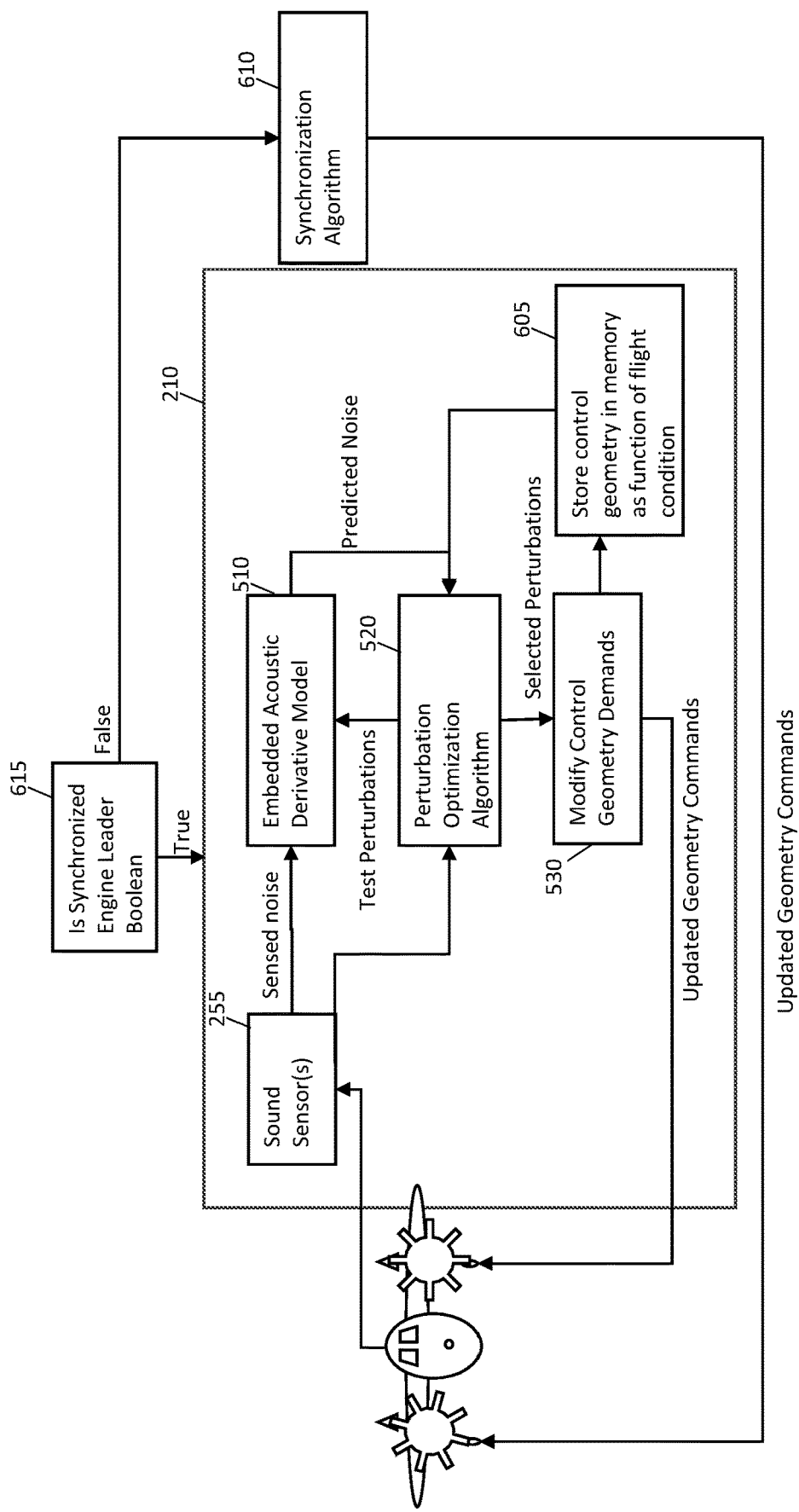
FIG. 6 is a functional block diagram for sound-based active engine control according to some embodiments.

Next referring to FIG. 6, a flow diagram of a process of sound-based engine controls with engine synchronization according to some embodiments is shown. In some embodiments, one or more steps of FIG. 6 is performed with a processor-based control system of an engine such as the engine controller 210 of the engine 100.

In some embodiments, in a multi-engine aircraft, one of the engines on the aircraft is assigned as the leader to maintain the engines in a synchro-phased state. In such aircrafts, aircraft controller or the engine controller 210 may first determine if a select engine is the synchronized engine leader based on a Boolean 615. If the engine is the leader, the controls are determined and updated based on the same or similar process as described with reference to FIG. 5. FIG. 6 further shows that control geometry determined based on the selected perturbation is stored in memory 605 as a function of flight conditions. The stored control geometry may be used to update the embedded acoustic derivative model 510 and/or the perturbation optimization algorithm 520. For example, the sound response from the changed geometry may be used as a data point to update the prediction algorithm/model for perturbation optimization.

If the engine is not the leader, the engine is instead controlled via a synchronization algorithm 610 that receives the control parameters from the leader engine. For example, the control parameter may include modification of control signal to one or more of variable pitch blades, variable pitch inlet guide vanes, variable pitch outlet guide vanes, a turbine exhaust nozzle, a fan exhaust nozzle, fuel controls, and/or an electric fan motor. The non-leader engine then synchronizes its controls to the modified control parameters of the leader engine, also deviating from the nominal schedule of the non-leader engine. For example, the non-leader engine may increase or decrease the pitch angle of a blade of vane relative to the nominal schedule.

Figure 7:
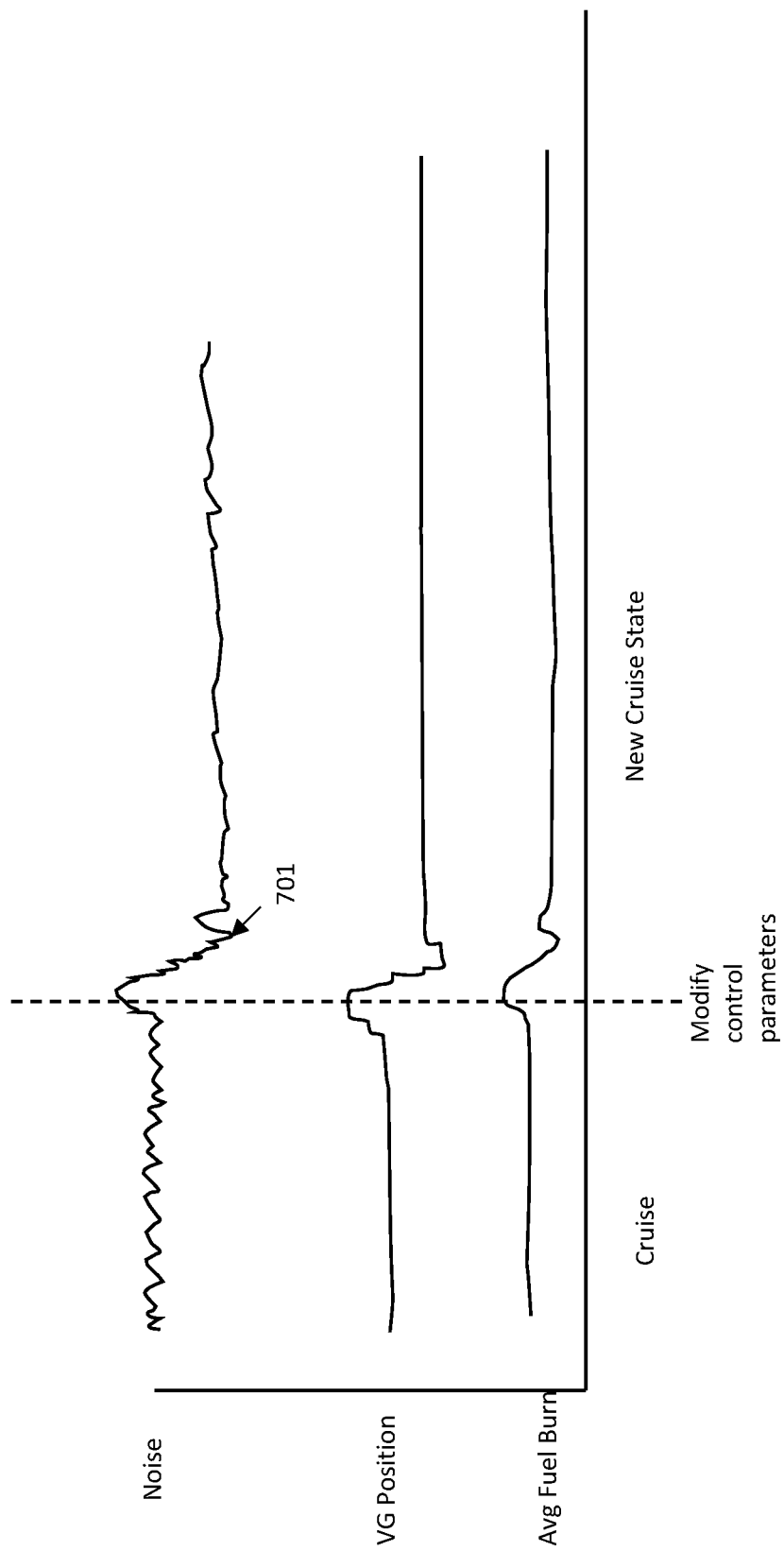
FIG. 7 is an illustration sound-based active control of a vane guide in accordance with some embodiments.

Next referring to FIG. 7, an illustration of sound-based active engine control is shown. FIG. 7 is a conceptual illustration only, and the lines shown on the graph are only to show relative changes of value over time and may not correspond to actual numerical values.

FIG. 7 shows the magnitude of the noise captured by a sound sensor 255 during a cruise state. In some embodiments, the noise is a sound component of a specific frequency band. The noise level may increase or decrease in response to changes in control parameters and/or environmental conditions. In some embodiments, the changes in control parameters in cruise state may be according to a nominal schedule. In the example shown in FIG. 7, changes in the vane guide (VG) position (e.g., pitch angle increase) leads to an increase of noise. In response to the increased noise, the engine controller 210 incrementally decreases the VG pitch angle until the noise level reaches a local minimum 701. That is, further decrease of VG pitch angle causes an increase in noise. The pitch position associated with the local minimum 701 is then used as the modified control parameter in the new cruise state, deviating from the pitch angle specified in the nominal schedule. In some embodiments, other thrust effectors may be controlled to compensate for the effect of the VG pitch on thrust such that thrust is maintained in the new cruise state.

The average fuel burn line shows that fuel efficiency can decrease (i.e., more fuel burn) with the increased noise level. After the modified control parameter is applied, fuel efficiency improves (i.e., less fuel burn) in the new cruise state as compared to the initial cruise state. By utilizing this correlation between noise/sound amplitude of select frequency with average fuel burn, the engine's efficiency can be improved via sound-based active controls.

In some embodiments, a control algorithm is provided that utilizes on-board noise/acoustic sensors to adjust fan blade pitch, which reduces noise and enhancing the efficiency of the fan.

In some embodiments, the control algorithm employs model-based derivatives of fan blade pitch perturbations to noise, instead of sensors, to schedule pitch. In some embodiments, the control algorithm uses inlet guide vanes, outlet guide vanes, and fan speed, instead of fan blade pitch, to influence noise.

In some embodiments, a modified control architecture allows individual blades or groupings of blades to have different pitch angles for localized efficiency optimization. In some embodiments, a control architecture enables individual or groupings of inlet or outlet guide vanes to be manipulated independently for localized efficiency optimization. In some embodiments, a control algorithm may track modifications made to pitch or variable geometries as indicators of fan blade efficiency or health.

In one example scenario, sound-based controls may be used when an aircraft is cruising at high altitude. On-board acoustic sensors indicate levels of blade wake noise. An on-board model is used to predict noise sensitivity to perturbations in pitch, guide vanes, or speed while maintaining thrust. Updated control demand signals are sent to variable geometries or fuel control, resulting in a more optimal engine running state configured for cruise. The updated configuration is stored for future flight information, and blade efficiency is tracked.

With the system and methods described herein, a controller on-board an engine 100 (e.g., FADEC) can actively modify the controls of one or more trust effector devices based on real-time sound sensor data to improve engine performance metrics such as increased fuel efficiency and reduced noise level.

Embodiments of the present disclosure can result in improved fuel burn due to higher efficiency operation in fan blades and reduced noise generation at various operating conditions.

Further aspects of the disclosure are provided by the subject matter of the following clauses:

An engine system is provided, including: a sound sensor coupled to the engine system configured to capture sound from the engine system; one or more thrust effector devices; and an engine controller communicatively coupled to the sound sensor and the one or more thrust effector devices, the engine controller is configured to: determine a sound profile based on signals from the sound sensor; determine a modified control parameter for at least one of the one or more thrust effector devices based on the sound profile and a nominal schedule; and control the at least one of the one or more thrust effector devices according to the modified control parameter, deviating from the nominal schedule.

The engine system of any of the preceding clauses, wherein the sound sensor includes a phased array sound sensor and/or a microelectromechanical phased array sound sensor.

The engine system of any of the preceding clauses, wherein the sound sensor is in a closed control loop with the at least one of the one or more thrust effector devices.

The engine system of any of the preceding clauses, wherein the at least one of the one or more thrust effector devices is controlled according to the modified control parameter in response to detecting a noise reduction trigger condition.

The engine system of any of the preceding clauses, wherein the noise reduction trigger condition is detected when a select sound component of the sound profile has a select frequency band with a magnitude exceeding a threshold value.

The engine system of any of the preceding clauses, wherein the noise reduction trigger condition includes the engine system being in a steady-state operation.

The engine system of any of the preceding clauses, wherein the sound profile is determined based on isolating sound components from different sources based on location, frequency, amplitude, and phase data of sound waves captured by the sound sensor.

The engine system of any of the preceding clauses, wherein the sound profile isolates fan sound components associated with self-noise of a fan and interaction sound components associated with airflow between rotating blades of the fan and other engine components.

The engine system of any of the preceding clauses, further includes an analog RMS meter for computing RMS values of the sound captured from the sound sensor, wherein the sound profile includes RMS values of one or more frequency bands.

The engine system of any of the preceding clauses, wherein modified operating parameters is determined based on the engine controller performing a pitch search by incrementally changing a pitch angle of one or more rotating blades or stationary vanes of the engine system until a local minimum sound amplitude for a select frequency band is identified.

The engine system of any of the preceding clauses, further including a memory storage device storing a control parameter table including modified control parameter corresponding to one or more engine parameters, wherein the modified control parameter is determined based on the control parameter table.

The engine system of any of the preceding clauses, wherein the one or more engine parameters include a target thrust, control parameters of the nominal schedule, and/or signals from one or more engine, flight, or environmental sensors.

The engine system of any of the preceding clauses, further including a memory storage device storing an engine model, wherein the engine controller is configured to: select a plurality of candidate control parameter sets based on one or more engine parameters; predict sound magnitudes for each of the candidate control parameter set using the engine model; and the modified control parameter based on a candidate control parameter set with a lowest predicted sound magnitude.

The engine system of any of the preceding clauses, wherein the plurality of candidate control parameter sets is selected based on maintaining a target thrust of the engine system.

The engine system of any of the preceding clauses, wherein the modified control parameter is determined based on a constraint optimization algorithm and an engine model, wherein the constraint optimization algorithm uses maintaining thrust within a threshold range as a constraint and reducing sound amplitude as a cost function.

The engine system of any of the preceding clauses, wherein the modified control parameter is determined based on a steepest descent algorithm.

The engine system of any of the preceding clauses, wherein the modified control parameter is selected to maintain a target thrust associated with the nominal schedule or cause the least amount of reduction to a thrust of the engine system.

The engine system of any of the preceding clauses, wherein the one or more thrust effector devices include a blade pitch change mechanism configured to change pitch angles of rotating blades of the engine system; and wherein the modified control parameter includes a change in the pitch angles of one or more of the rotating blades.

The engine system of any of the preceding clauses, wherein the one or more thrust effector devices include one or more vane pitch changing mechanisms configured to change pitch angles of inlet guide vanes and/or outlet guide vanes, and the modified control parameter includes a change in the pitch angles of one or more of the vanes.

The engine system of any of the preceding clauses, wherein the one or more thrust effector devices include a fuel injector or an electric fan motor, and the modified control parameter includes a modified rotation speed of a fan.

The engine system of any of the preceding clauses, wherein the engine controller is further configured to store the modified control parameter for fan blade and/or engine health analysis.

The engine system of any of the preceding clauses, wherein the engine controller is further configured to: determine a subsequent sound profile based on data captured by the sound sensor while at least one of the one or more thrust effector devices are controlled according to the modified control parameter; and store the subsequent sound profile with the modified control parameter in an engine model.

The engine system of any of the preceding clauses, wherein the engine controller includes a full authority digital engine control (FADEC) of the engine system and the nominal schedule includes engine command from an aircraft controller.

The engine system of any of the preceding clauses, wherein the engine system is mounted on an aircraft, and the engine controller is further configured to send the modified control parameter to an aircraft controller and/or a second engine system mounted on the aircraft to cause synchronization of the second engine system with the engine system.

The engine system of any of the preceding clauses, wherein the engine system is an open fan turbine engine.

A method for controlling an engine system is provided. The method includes capturing sound from the engine system using a sound sensor coupled to the engine system including an engine controller and one or more thrust effector devices; determining, with the engine controller, a sound profile based on signals from the sound sensor; determining, with the engine controller, a modified control parameter for at least one of the one or more thrust effector devices based on the sound profile and a nominal schedule; and controlling the at least one of the one or more thrust effector devices according to the modified control parameter, deviating from the nominal schedule.

The method of any of the preceding clauses, wherein the sound sensor includes a phased array sound sensor and/or a microelectromechanical phased array sound sensor.

The method of any of the preceding clauses, wherein the sound sensor is in a closed control loop with the at least one of the one or more thrust effector devices.

The method of any of the preceding clauses, wherein the at least one of the one or more thrust effector devices is controlled according to the modified control parameter in response to detecting a noise reduction trigger condition.

The method of any of the preceding clauses, wherein the noise reduction trigger condition is detected when a select sound component of the sound profile has a select frequency band with a magnitude exceeding a threshold value.

The method of any of the preceding clauses, wherein the noise reduction trigger condition includes the engine system being in a steady-state operation.

The method of any of the preceding clauses, wherein the sound profile is determined based on isolating sound components from different sources based on location, frequency, amplitude, and phase data of sound waves captured by the sound sensor.

The method of any of the preceding clauses, wherein the sound profile isolates fan sound components associated with self-noise of a fan and interaction sound components associated with airflow between rotating blades of the fan and other engine components.

The method of any of the preceding clauses, further includes an analog RMS meter for computing RMS values of the sound captured from the sound sensor, wherein the sound profile includes RMS values of one or more frequency bands.

The method of any of the preceding clauses, wherein modified operating parameters is determined based on the engine controller performing a pitch search by incrementally changing a pitch angle of one or more rotating blades or stationary vanes of the engine system until a local minimum sound amplitude for a select frequency band is identified.

The method of any of the preceding clauses, further including a memory storage device storing a control parameter table including modified control parameter corresponding to one or more engine parameters, wherein the modified control parameter is determined based on the control parameter table.

The method of any of the preceding clauses, wherein the one or more engine parameters include a target thrust, control parameters of the nominal schedule, and/or signals from one or more engine, flight, or environmental sensors.

The method of any of the preceding clauses, further including a memory storage device storing an engine model, wherein the engine controller is configured to: select a plurality of candidate control parameter sets based on one or more engine parameters; predict sound magnitudes for each of the candidate control parameter set using the engine model; and the modified control parameter based on a candidate control parameter set with a lowest predicted sound magnitude.

The method of any of the preceding clauses, wherein the plurality of candidate control parameter sets is selected based on maintaining a target thrust of the engine system.

The method of any of the preceding clauses, wherein the modified control parameter is determined based on a constraint optimization algorithm and an engine model, wherein the constraint optimization algorithm uses maintaining thrust within a threshold range as a constraint and reducing sound amplitude as a cost function.

The method of any of the preceding clauses, wherein the modified control parameter is determined based on a steepest descent algorithm.

The method of any of the preceding clauses, wherein the modified control parameter is selected to maintain a target thrust associated with the nominal schedule or cause the least amount of reduction to a thrust of the engine system.

The method of any of the preceding clauses, wherein the one or more thrust effector devices include a blade pitch change mechanism configured to change pitch angles of rotating blades of the engine system; and wherein the modified control parameter includes a change in the pitch angles of one or more of the rotating blades.

The method of any of the preceding clauses, wherein the one or more thrust effector devices include one or more vane pitch changing mechanisms configured to change pitch angles of inlet guide vanes and/or outlet guide vanes, and the modified control parameter includes a change in the pitch angles of one or more of the vanes.

The method of any of the preceding clauses, wherein the one or more thrust effector devices include a fuel injector or an electric fan motor, and the modified control parameter includes a modified rotation speed of a fan.

The method of any of the preceding clauses, wherein the engine controller is further configured to store the modified control parameter for fan blade and/or engine health analysis.

The method of any of the preceding clauses, wherein the engine controller is further configured to: determine a subsequent sound profile based on data captured by the sound sensor while at least one of the one or more the thrust effector devices are controlled according to the modified control parameter; and store the subsequent sound profile with the modified control parameter in an engine model.

The method of any of the preceding clauses, wherein the engine controller includes a full authority digital engine control (FADEC) of the engine system and the nominal schedule includes engine command from an aircraft controller.

The method of any of the preceding clauses, wherein the engine system is mounted on an aircraft, and the engine controller is further configured to send the modified control parameter to an aircraft controller and/or a second engine system mounted on the aircraft to cause synchronization of the second engine system with the engine system.

The method of any of the preceding clauses, wherein the engine system is an open fan turbine engine.

An engine controller device is provided, including: a processor executing computer-readable instructions stored on a computer-readable memory storage medium, the computer-readable instructions configured cause the processor to: receive a signal from a sound sensor coupled to an engine system, the sound sensor configured to capture sound from the engine system, determine a sound profile based on signals from the sound sensor; determine a modified control parameter for at least one of one or more thrust effector devices of the engine system based on the sound profile and a nominal schedule, and control the at least one of the one or more thrust effector devices according to the modified control parameter, deviating from the nominal schedule.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. An engine system comprising:
a sound sensor coupled to the engine system configured to capture sound from the engine system;
one or more thrust effector devices; and
an engine controller communicatively coupled to the sound sensor and the one or more thrust effector devices, the engine controller is configured to:
determine a sound profile based on signals from the sound sensor;
determine a modified control parameter for at least one of the one or more thrust effector devices based on the sound profile and a nominal schedule; and
control the at least one of the one or more thrust effector devices according to the modified control parameter, deviating from the nominal schedule;
wherein the sound profile isolates fan sound components associated with self-noise of a fan and interaction sound components associated with airflow between rotating blades of the fan and other engine components.

2. The engine system of claim 1, wherein the sound sensor comprises one or more of a phased array sound sensor or a microelectromechanical phased array sound sensor.

3. The engine system of claim 1, wherein the sound sensor is in a closed control loop with the at least one of the one or more thrust effector devices.

4. The engine system of claim 1, wherein the at least one of the one or more thrust effector devices is controlled according to the modified control parameter in response to detecting a noise reduction trigger condition.

5. The engine system of claim 4, wherein the noise reduction trigger condition comprises the engine system being in a steady-state operation.

6. The engine system of claim 1, wherein the sound profile is determined based on isolating sound components from different sources based on location, frequency, amplitude, and phase data of sound waves captured by the sound sensor.

7. The engine system of claim 1, further comprising an analog root-mean-square (RMS) meter for computing RMS values of the sound captured from the sound sensor, wherein the sound profile comprises RMS values of one or more frequency bands.

8. The engine system of claim 1, further comprising a memory storage device storing a control parameter table comprising modified control parameter corresponding to one or more engine parameters, wherein the modified control parameter is determined based on the control parameter table.

9. The engine system of claim 8, wherein the one or more engine parameters comprise a target thrust, control parameters of the nominal schedule, and/or signals from one or more engine, flight, or environmental sensors.

10. The engine system of claim 1, wherein the modified control parameter is determined based on a constraint optimization algorithm and an engine model, wherein the constraint optimization algorithm uses maintaining thrust within a threshold range as a constraint and reducing sound amplitude as a cost function.

11. The engine system of claim 1, wherein the one or more thrust effector devices comprise a blade pitch change mechanism configured to change pitch angles of rotating blades of the engine system; and
wherein the modified control parameter comprises a change in the pitch angles of one or more of the rotating blades.

12. The engine system of claim 1, wherein the one or more thrust effector devices comprise one or more vane pitch changing mechanisms configured to change pitch angles of inlet guide vanes or outlet guide vanes, and the modified control parameter comprises a change in the pitch angles of one or more of the inlet guide vanes or the outlet guide vanes.

13. The engine system of claim 1, wherein the one or more thrust effector devices comprise a fuel injector or an electric fan motor, and the modified control parameter comprises a modified rotation speed of a fan.

14. The engine system of claim 1, wherein the engine controller is further configured to:
  determine a subsequent sound profile based on data captured by the sound sensor while at least one of the one or more thrust effector devices are controlled according to the modified control parameter; and
  store the subsequent sound profile with the modified control parameter in an engine model.

15. The engine system of claim 1, wherein the engine system is mounted on an aircraft, and the engine controller is further configured to send the modified control parameter to an aircraft controller or a second engine system mounted on the aircraft to cause synchronization of the second engine system with the engine system.

16. An engine system comprising:
  a sound sensor coupled to the engine system configured to capture sound from the engine system;
  one or more thrust effector devices; and
  an engine controller communicatively coupled to the sound sensor and the one or more thrust effector devices, the engine controller is configured to:
  determine a sound profile based on signals from the sound sensor;
  determine a modified control parameter for at least one of the one or more thrust effector devices based on the sound profile and a nominal schedule; and
  control the at least one of the one or more thrust effector devices according to the modified control parameter, deviating from the nominal schedule;
  wherein modified operating parameters is determined based on the engine controller performing a pitch search by incrementally changing a pitch angle of one or more rotating blades or stationary vanes of the engine system until a local minimum sound amplitude for a select frequency band is identified.

17. An engine system comprising:
  a sound sensor coupled to the engine system configured to capture sound from the engine system;
  one or more thrust effector devices; and
  an engine controller communicatively coupled to the sound sensor and the one or more thrust effector devices, the engine controller is configured to:
  determine a sound profile based on signals from the sound sensor;
  determine a modified control parameter for at least one of the one or more thrust effector devices based on the sound profile and a nominal schedule;
  control the at least one of the one or more thrust effector devices according to the modified control parameter, deviating from the nominal schedule; and
  a memory storage device storing an engine model, wherein the engine controller is configured to:
  select a plurality of candidate control parameter sets based on one or more engine parameters;
  predict sound magnitudes for each of the plurality of candidate control parameter sets using the engine model; and
  determine the modified control parameter based on a candidate control parameter set with a lowest predicted sound magnitude.

18. The engine system of claim 17, wherein the plurality of candidate control parameter sets is selected based on maintaining a target thrust of the engine system.

19. A method for controlling an engine system, comprising:
  capturing sound from the engine system using a sound sensor coupled to the engine system comprising an engine controller and one or more thrust effector devices;
  determining, with the engine controller, a sound profile based on signals from the sound sensor;
  determining, with the engine controller, a modified control parameter for at least one of the one or more thrust effector devices based on the sound profile and a nominal schedule; and
  controlling the at least one of the one or more thrust effector devices according to the modified control parameter, deviating from the nominal schedule;
  wherein the sound profile isolates fan sound components associated with self-noise of a fan and interaction sound components associated with airflow between rotating blades of the fan and other engine components.

* * * * *